United States Patent [19]
Schwerdt et al.

[11] Patent Number: 6,136,134
[45] Date of Patent: *Oct. 24, 2000

[54] PROCESS FOR MANUFACTURING A PRESSED-IN TORSIONAL VIBRATION DAMPER

[75] Inventors: Hans-Werner Schwerdt, Laudenbach; Helmut Lau, Birkenau, both of Germany

[73] Assignee: Hans-Werner Schwerdt, Laudenbach, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/385,256

[22] Filed: Feb. 8, 1995

[30] Foreign Application Priority Data

Feb. 10, 1994 [DE] Germany .............................. 44 04 255

[51] Int. Cl.⁷ ................................ B32B 31/00; C09J 7/00
[52] U.S. Cl. ............................ 156/294; 74/574; 156/313; 188/378
[58] Field of Search ................................... 156/294, 313; 74/574; 188/378

[56] References Cited

U.S. PATENT DOCUMENTS

| | | |
|---|---|---|
| 2,909,204 | 10/1959 | Somerville ............................ 156/313 |
| 3,054,305 | 9/1962 | Troyer ..................................... 74/574 |
| 3,399,103 | 8/1968 | Salyer et al. . |
| 3,803,078 | 4/1974 | Klement . |
| 3,901,101 | 8/1975 | McGavern . |
| 3,925,590 | 12/1975 | Hausch et al. . |
| 4,182,138 | 1/1980 | McGuire .................................... 74/574 |
| 4,308,365 | 12/1981 | Czerwinski . |
| 4,849,047 | 7/1989 | Ferguson .................................. 156/294 |
| 5,137,944 | 8/1992 | Isobe et al. . |
| 5,204,409 | 4/1993 | Arend et al. . |
| 5,279,900 | 1/1994 | Takeuchi et al. . |

FOREIGN PATENT DOCUMENTS

| | | |
|---|---|---|
| 2 044 094 | 10/1991 | Canada . |
| 0 441 480 | 8/1991 | European Pat. Off. . |
| 0 525 863 | 2/1993 | European Pat. Off. . |
| 1-144485 | 6/1989 | Japan . |
| 461478 | 2/1937 | United Kingdom .................. 156/294 |
| 1 369 228 | 10/1974 | United Kingdom . |
| 2 038 446 | 7/1980 | United Kingdom . |
| 2 233 424 | 1/1991 | United Kingdom . |

OTHER PUBLICATIONS

Elvers, Barbara et al., "Refractory Ceramics to Silicon Carbide," *Ullmann's Encyclopedia of Industrial Chemistry*, vol. A23, pp. 317–320.

*Primary Examiner*—John J. Gallagher
*Attorney, Agent, or Firm*—Kenyon & Kenyon

[57] ABSTRACT

In the manufacture of a pressed-in torsional vibration damper, the contact surfaces of the components arranged concentrically with one another are coated, before the elastomeric spacer ring is inserted, with an adhesive which is then activated by fitting the components together. The adhesive is subsequently cold-cured or catalytically activated.

17 Claims, No Drawings

PROCESS FOR MANUFACTURING A PRESSED-IN TORSIONAL VIBRATION DAMPER

BACKGROUND OF THE INVENTION

1. Field of the Invention

The invention relates to a process for manufacturing a pressed-in torsional vibration damper.

2. Description of Related Art

Pressed-in torsional vibration dampers generally consist of two metal rings arranged concentrically and spaced apart from one another, and an elastomeric spacer ring pressed into the annular gap, such that contact surfaces are formed between the metal and elastic components. The elastomeric spacer ring joins the flywheel ring to the hub ring arranged concentrically therewith, and damps the mutual torsional vibrations of the metal rings during operation. Accordingly, the invention also encompasses analogously configured annular components which damp torsional movements, such as rollers, ultra sleeves, and spherical bearings.

The spacer ring, which has a radial overdimension, is installed in the annular gap provided therefor between the metal rings by means of an application of force (insertion) parallel to the torsional vibration axis, such that the spacer ring is pressed into the gap. A torsional vibration damper of this kind is described, for example, in DE-OS 38 25 062.

Ordinarily, the available annular gap compresses the spacer ring, when it is pressed in, to 60% of its original radial thickness. This results in a defined stiffness of the elastomeric ring and thus a resonant frequency of the spring/mass system in the torsional vibration damper which cannot be decreased without, for example, enlarging the annular gap, which in most cases is impossible because the installation dimensions are predetermined.

Attempts to decrease these resonant frequencies simply by means of softer compliance, ie. via a lower radial compression pressure for the spacer ring, have been unsuccessful due to its incomplete static friction at the hub and flywheel rings due to insufficient radial pressures, especially after extended operation.

In ELASTOMERICS (January 1982), pp. 21–23, N. Hofmann and R. Riege propose a relevant rubber-metal adhesive joint such that the rubber surfaces of the spacer ring are precleaned with halogenated chlorohydrocarbons. The metal surfaces are also precleaned by using steam or chemical agents to remove grease.

The contact surfaces of the metal rings and/or of the elastomeric spacer ring are then given a film of adhesive, using an adhesive that is dry during assembly of the vibration damper and subsequently receives its adhesive ability by being post-vulcanized at, for example, 250° F. (121° C.) for 15 minutes. During this post-vulcanization the parts being adhesively bonded must be kept under radial pressure, which depends on the Shore hardness of the elastomeric ring.

In practice, however, this process yields satisfactory adhesive strength only above 150° C. and after 30 minutes.

Another disadvantage of heat-treated, or "post-vulcanized," adhesives is that the geometrical arrangement of the hub, elastomeric, and flywheel rings can change due to the extreme heat treatment, so that the components must be immobilized during adhesive bonding. This action, and the heat treatment, inherently produce a bottleneck in the production sequence.

SUMMARY OF THE INVENTION

One object of the present invention is to provide a process of this kind for manufacturing a pressed-in torsional vibration damper such that with no variation in other parameters, for example the Shore hardness or annular gap dimensions, the resonant frequency of the spring/mass system is decreased, ie. a softer compliance is achieved, by reducing the radial compression of the elastomeric ring to a thickness reduction of only 20% down to 0% (exact fit) of the original thickness prior to insertion. Nevertheless, the adhesive rubber-metal joint is intended to be so stable over the long term that absolutely no mutual displacement of the joining surfaces takes place.

Dryable adhesives suitable for applications at such low or nonexistent compression pressures were not previously known for use in the art of assembling torsional vibration damper components.

A further object of the invention is to eliminate, in all cases, heating of the components of the vibration damper above 100° C.

The invention is a process that uses a post-activated adhesive which affixes the elastomeric spacer ring to the metal or polymer hub ring, and also to the metal flywheel ring.

DETAILED DESCRIPTION OF THE INVENTION

The invention is a process for manufacturing a pressed-in torsional vibration damper in which the contact surface of the elastomeric spacer ring is coated with adhesive, the spacer ring is then inserted into the annular gap between the hub and flywheel rings, and the adhesive is then activated by fitting together the parts forming the torsional vibration damper. This process is characterized by the fact that cold-curing or catalytically activated adhesives are used. Advantageously, these are nonadhesive after drying.

The adhesive types that can be used are named below.

It is of course important to ensure, before the adhesive is applied, that the adhering surfaces are clean and grease-free. Suitable cleaning reagents and methods are well known in the art.

Application can occur with any desired process, for example by brushing, rolling, spraying, or immersion, such that the film has an advantageous film thickness of 5 to 30 $\mu$m. These film thicknesses lie in the range common with adhesive methods, and can easily be from 1 $\mu$m to 100 $\mu$m thinner or thicker, provided the resulting adhesive bonds are still sufficient for the subsequent loads on the components. The subsequent crosslinking can be accelerated by the action of mild heat. Depending on the adhesive type, it will be found that dry surfaces are obtained after sitting at room temperature for 24 hours, or after an average of 5 minutes and exposure to heat at a maximum of 90° C.

With elastomers that readily bond adhesively, such as nitrile rubbers, it is sufficient to provide only the adhering surfaces of the spacer ring with an adhesive film.

In cases in which elastomers which are difficult to bond adhesively, such as ethylene-propylene-diene terpolymers, are present, or in which the components are to be subjected to high operating temperatures or high mechanical stresses, it is advantageous to coat both the elastomeric and the metal adhering surfaces with an adhesive film.

In addition to the adhesive, the use of friction-reducing, high-viscosity additives, which is common in the insertion method, is also possible and recommended with the adhesives used according to the invention. These additives are applied, immediately before the torsional vibration damper is assembled, onto the surfaces that will come in contact with each other; they facilitate undamaged insertion of the elastomeric spacer ring into the annular gap.

It was surprising and completely unexpected that the adhesive effect would be so intense that, in contrast to post-vulcanizing adhesives, spacer ring compression forces in the annular gap of as little as zero could be achieved, ie. that the spacer ring would need to be compressed only to a maximum of 80% of its original radial thickness, or that this compression could be entirely omitted. Thus, it is possible for the first time to reduce the resonant frequency of the spring/mass system of a pressed-in torsional vibration damper simply by reducing the radial compression force which acts on the elastomeric spacer ring, possibly to zero, in such a way that a soft elastomeric spring is present. This need not be accompanied by the disadvantage of a relative displacement between the elastomeric ring and the concentric metal rings, as was previously the case because conventional adhesive types, even post-activated ones, failed in such instances.

Examples of preferred adhesives which can be used in the practice of the present invention include: adducts of polyaddition or polycondensation polymers; educts of polyaddition or polycondensation polymers (the term "educt" being used to refer to the starting materials before chemical reaction); adducts of polymerization polymers; educts of polymerization polymers; and mixtures thereof.

Particularly preferred adhesives for use in the process according to the invention belong to the following systems:

1. A halogen-containing polymer having at least two nitroso groups or a crosslinker that forms nitroso groups during activation, together with a catalytically active metal and an isocyanate. For example, chlorine rubber with p-dinitrosobenzene, copper, or nickel catalyst, and isocyanate additive. Optionally, this adhesive system may be used in combination with an adduct of polyaddition or polycondensation polymers, an educt of polyaddition or polycondensation polymers or an adduct of polymerization polymers.

2. Catalyzed single-component epoxy resins that spontaneously crosslink by means of -onium salts of $BF_4^-$, $PF_6^-$, $AsF_6^-$, or $SbF_6^-$, advantageously when heated to 60 to 90° C.

3. Silicone adhesives, modified with tin-containing catalysts such as tin octate, which are cold-curing and can be activated by the action of heat at up to 70° C.

4. Cyanoacrylates in which polymerization and adhesion are initiated by small quantities of diffused-in water which is located in the elastomer material and on the metal or polymer hub, and is available as atmospheric humidity.

5. Polyacrylates that, when the components are fitted together, form a crosslinked adhesive film with catalytically active transition metal ions such as Cu or Ni which detach from the material of the hub or from the elastomer material.

6. Cold-curing two-component epoxy resins which are first mixed and then applied onto adhering surfaces, or which are applied separately onto facing adhering surfaces before they are fitted together. Crosslinking then occurs spontaneously after a certain time; advantageously, however, it can be accelerated at temperatures up to a maximum of 90° C.

7. Adhesives of system 5, together with a polyacrylate with no double bonds and with styrene.

8. Adhesives of system 7, with dibenzoyl peroxide and maleic anhydride.

9. Two-component acrylate adhesives with one amine-containing and one peroxide-containing component.

The adhesive systems used in accordance with the invention may also contain a crosslinking adjuvant, such as an organic peroxide which is solid at room temperature or an unsaturated carboxylic anhydride.

The adhesives used in accordance with the invention are available as highly viscous liquids or as solids which are adjusted to their processing viscosity by the addition of solvents or polymers. As in the prior art, fillers, reactive thinners, amines, and peroxides can be added. Corrosion-protection and coloring additives also do not impair the activation of the adhesives as described.

The adhesive used in accordance with the invention may contain a dissolved or dispersed polymer and a reactive thinner as crosslinking agents.

Processing of the individual adhesive systems in accordance with the process according to the invention will be described below with reference to examples which are to be regarded in an illustrative, rather than a restrictive, sense.

Adhesive Systems 1 and 3

To manufacture the torsional vibration damper, the surfaces of the hub, flywheel ring, and elastomeric ring are cleaned in the adhering region. Then the adhering regions of the hub and flywheel ring are coated with the adhesive system. Insertion then takes place, after which the temperature is raised to 60 to 90° C. The adhesive bonding process is complete within one hour.

Adhesive System 2

After the surfaces, cleaned as above, are coated with adhesive, the components can be stored. After insertion at any desired time, the adhesive bonding process can be completed within one hour by heating to temperatures of 60 to 80° C.

Adhesive Systems 4 and 5

The surfaces, cleaned as for adhesive system 1, are coated with the adhesive. Insertion then occurs, and after two hours at room temperature the adhesive bonding reaction is complete.

Adhesive Systems 6 and 7

The two components of the adhesive are premixed and applied onto surfaces cleaned as for adhesive system 1. Insertion occurs immediately thereafter. The parts can be stored. Heating to 80° C. completes the crosslinking reaction in one hour.

Adhesive System 8

After cleaning of the surfaces being bonded, as described, and insertion immediately thereafter, the adhesive bonding reaction occurs at room temperature within one day. Heating to 60 to 80° C. accelerates the crosslinking reaction to 1 to 2 hours.

Adhesive System 9

To manufacture the torsional vibration damper, the surfaces of the hub, flywheel ring, and elastomeric ring are cleaned in the adhering region. Then the adhering regions of the hub and flywheel ring are coated with a peroxide-containing adhesive, and the adhering surfaces of the elastomeric ring with an amine-containing adhesive. The parts can be stored in this condition.

The elastomeric ring is then pressed into the gap between hub and flywheel ring. The crosslinking reaction, in which the amine diffuses into the peroxide and initiates its decomposition, is complete after a few minutes at 70° C.

What is claimed is:

1. A process for manufacturing a pressed-in torsional vibration damper, comprising the steps of: concentrically arranging a metal hub ring and a metal flywheel ring spaced apart from one another to define an annular gap therebetween, each metal ring having a surface which can contact a contact surface of an elastomeric spacer ring pressed into the annular gap; coating the contact surfaces of the spacer ring or the contact surface of the hub ring and flywheel ring or the contact surfaces of the spacer ring, the hub ring and the flywheel ring with a cold-curable adhesive or a catalytically activated adhesive or a mixture thereof, the adhesives being initially non-adhesive; inserting the spacer ring into the annular gap between the hub ring and flywheel ring, while the adhesive is initially non-adhesive, to engage the contact surface of the hub ring and the flywheel ring with a contact surface of the spacer ring; and subsequently curing or activating the adhesive without heating it to a temperature greater than 90° C. to bond the rings together and form the torsional vibration damper, wherein the adhesive is selected from the group consisting of:

chlorine rubbers with p-dinitrosobenzene, a copper or nickel catalyst, and an isocyanate additive, catalyzed single-component epoxy resins that spontaneously crosslink by means of -onium salts of $BF_4^-$, $PF_6^-$, $AsF_6^-$ or $SbF_6^-$, silicone adhesives, modified with a tin-containing catalyst, which are cold-curable and can be activated by the action of heat at up to 70° C., cyanoacrylates, polyacrylates that form a cross-linked adhesive film with catalytically active transition metal ions, after the spacer ring is inserted into the annular gap, cold-curable two-component epoxy resins, polyacrylates that form a cross-linked adhesive film with catalytically active transition metal ions after the spacer ring is inserted into the annular gap, together with a polyacrylate with no double bonds and with styrene, polyacrylates that form a cross-linked adhesive film with catalytically active transition metal ions after the spacer ring is inserted into the annular gap, together with a polyacrylate with no double bonds and with styrene, and with dibenzoyl peroxide and maleic anhydride, two-component acrylate adhesives which include one amine-containing and one peroxide-containing component.

2. The process according to claim 1 wherein the adhesive used includes a halogen-containing polymer that contains at least two nitroso groups or a crosslinker that forms nitroso groups during its activation, and a catalytically active metal and an isocyanate.

3. The process according to claim 1 wherein the adhesive used includes an adduct of polyaddition or polycondensation polymers.

4. The process according to claim 1 wherein the adhesive used includes polyaddition or polycondensation polymers present as an educt.

5. The process according to claim 1 wherein the adhesive used includes an adduct of polymerization polymers.

6. The process according to claim 1 wherein the adhesive used includes polymerization polymers present as an educt.

7. The process according to claim 3 wherein the adhesive used further includes polyaddition or polycondensation polymers present as an educt.

8. The process according to claim 2 wherein the adhesive further includes an adduct of polyaddition or polycondensation polymers.

9. The process according to claim 2 wherein the adhesive further includes polyaddition or polycondensation polymers present as an educt.

10. The process according to claim 2 wherein the adhesive further includes an adduct of polymerization polymers.

11. The process according to claim 1 wherein the adhesive used contains a dissolved or dispersed polymer and a reactive thinner as crosslinking agents.

12. The process according to claim 1 wherein the adhesive contains an organic peroxide that is solid at room temperature or an unsaturated carboxylic anhydride, as a crosslinking adjuvant.

13. The process according to claim 1 wherein the adhesive includes a two-component acryl system with one amine and one peroxide component.

14. The process according to claim 1 wherein the adhesive spontaneously cures or becomes activated after inserting the elastomeric spacer ring into the annular gap.

15. The process according to claim 1, wherein the elastomeric spacer ring has a radial thickness which is reduced by compression in the radial direction by no greater than 20% upon inserting the spacer ring into the annular gap between the hub ring and the flywheel ring.

16. The process according to claim 1, wherein the elastomeric spacer ring has a radial thickness which is essentially not reduced by any compression in the radial direction upon inserting the spacer ring into the annular gap between the hub ring and the flywheel ring.

17. The process according to claim 1, wherein the adhesive is activated or cured without raising its temperature.

* * * * *